(12) United States Patent  
Buchheit

(10) Patent No.: US 8,523,105 B2  
(45) Date of Patent: Sep. 3, 2013

(54) AIRCRAFT PROVIDED WITH A FUEL CELL SYSTEM

(75) Inventor: Catherine Buchheit, L'isle Jourdain (FR)

(73) Assignee: Airbus, Blagnac Cedex (FR)

( * ) Notice: Subject to any disclaimer, the term of this patent is extended or adjusted under 35 U.S.C. 154(b) by 23 days.

(21) Appl. No.: 13/321,646

(22) PCT Filed: Jun. 14, 2010

(86) PCT No.: PCT/FR2010/051177  
§ 371 (c)(1),  
(2), (4) Date: Nov. 21, 2011

(87) PCT Pub. No.: WO2010/146291  
PCT Pub. Date: Dec. 23, 2010

(65) Prior Publication Data  
US 2012/0068008 A1    Mar. 22, 2012

(30) Foreign Application Priority Data

Jun. 17, 2009 (FR) .................................. 09 02941

(51) Int. Cl.  
*B64D 41/00* (2006.01)  
*B64D 37/02* (2006.01)  
*B64D 37/04* (2006.01)  
*B64C 1/00* (2006.01)  
*B64C 1/22* (2006.01)

(52) U.S. Cl.  
USPC .......... 244/58; 244/120; 244/119; 244/117 R; 244/135 R

(58) Field of Classification Search  
USPC ..................... 244/120, 119, 117 R, 58, 135 R  
See application file for complete search history.

(56) References Cited

U.S. PATENT DOCUMENTS

| | | | | |
|---|---|---|---|---|
| 2,504,422 | A * | 4/1950 | Hawkins, Jr. et al. | 244/74 |
| 6,039,287 | A * | 3/2000 | Liston et al. | 244/54 |
| 6,244,539 | B1 * | 6/2001 | Liston et al. | 244/54 |
| 6,296,957 | B1 * | 10/2001 | Graage | 429/425 |

(Continued)

FOREIGN PATENT DOCUMENTS

| | | |
|---|---|---|
| DE | 102005045130 | 3/2007 |
| EP | 0957026 | 11/1999 |
| WO | 9805553 | 2/1998 |

OTHER PUBLICATIONS

"Tail Cone Fuel Tank", Civil Aviation Regulations 1998, Commonwealth of Australia Civil Aviation Safety Authority, Part 39-105.*

(Continued)

*Primary Examiner* — Tien Dinh  
*Assistant Examiner* — Michael Wang  
(74) *Attorney, Agent, or Firm* — Wood, Herron & Evans, LLP

(57) ABSTRACT

According to the invention, a rear portion of a fuselage of an aircraft contains a fuel cell system, and the aircraft further includes a rear cone which is removably mounted relative to the rear portion of the fuselage so as to form an extension thereof. The rear cone is shaped as a fuel tank for the fuel cell system contained in the rear portion of the fuselage. The rear cone includes at least one housing extending into the fuel tank and configured to receive at least one projecting slide extending from the rear portion of the fuselage.

10 Claims, 1 Drawing Sheet

(56) References Cited

U.S. PATENT DOCUMENTS

| | | | |
|---|---|---|---|
| 6,308,915 B1 * | 10/2001 | Liston et al. | 244/54 |
| 6,651,929 B2 * | 11/2003 | Dionne | 244/57 |
| 8,128,024 B2 * | 3/2012 | Rojas Sanchez et al. | 244/58 |
| 2008/0099611 A1 * | 5/2008 | Martino Gonzalez et al. | 244/119 |
| 2012/0006938 A1 * | 1/2012 | Gatzke | 244/58 |

OTHER PUBLICATIONS

European Patent Office, International Search Report PCT/FR2010/051177, Jan. 3, 2011 (2 pgs), Form PCT/ISA/210 (5 pgs.) English language translation of Form PCT/ISA/210 Written Opinion (5 pgs).

* cited by examiner

AIRCRAFT PROVIDED WITH A FUEL CELL SYSTEM

This application claims priority, under Section 371 and/or as a continuation under Section 120, to PCT Application No. PCT/FR2010/051177, filed on Jun. 14, 2010, which claims priority to French Application No. 0902941, filed on Jun. 17, 2009.

TECHNICAL FIELD

The present invention relates to an aircraft provided with a fuel cell system.

BACKGROUND

As known, numerous aircrafts comprise an auxiliary power plant adapted for producing energy on board so as to allow to supply on the ground, when the engines are stopped, and optionally in flight upon the breakdown of an engine, different aboard systems consuming electric power or using a pneumatic or hydraulic pressure.

It is also known that, as an auxiliary power plant, a fuel cell system can be used being connected to a fuel tank such a fuel cell system having numerous advantages upon its use, including the absence of emission of polluting particles, the production of water and a low level of noise.

However, the fuel tank inserted, assembled and fastened inside the fuselage of the aircraft is a limitation in the development of on board fuel cell systems. More particularly, this fuel tank does not allow to develop a satisfactory operational autonomy of the fuel cell system as a result of its reduced storage volume.

Moreover, it is difficult to be transported outside the aircraft, which involves, when the aircraft is on the ground, a filling service being relatively long to be implemented, difficult to achieve as a result of the delicate handling of the fuel, such as hydrogen, being easily flammable and consequently expensive. In addition, it requires using fuel filling pumps and stations.

Furthermore, structural members, acting as fire fighting barrier, should be arranged in the fuselage of the aircraft in the vicinity of the fuel tank.

Finally, the maintenance of the fuel tank, difficult to be accessed to in the fuselage of the aircraft, is not easy.

The present invention aims at solving these drawbacks.

SUMMARY OF THE INVENTION

To this end, according to this invention, an aircraft having rear portion of the fuselage containing a fuel cell system is remarkable in that it comprises a rear cone being removably mounted relative to said rear portion of the fuselage, so as to form an extension of the latter, and which is shaped as a fuel tank for said fuel cell system contained in said rear portion of the fuselage.

Thus, such a removable fuel tank, forming a rear cone, is interchangeable with another compatible tank, with an identical or different size, through handlings external to said aircraft.

Thanks to the removability and the interchangeability of the tank according to the present invention, it can be filled in the factory and can be re-used on the same aircraft or on other aircrafts. Once filled in the factory, the tank according to this invention can be stored in the vicinity of the aircraft, for being later fastened on the rear portion of the fuselage of the latter instead of a previously removed empty tank. Such a fuel supply can occur under secured conditions, avoiding any risky handling of fuel.

It should be noticed that the arrangement of the tank according to this invention, outside the fuselage of the aircraft, allows the structure of the rear cone to be adapted to constraints resulting from the fuel being stored rather that the structure of the fuselage of the aircraft being adapted to such constraints.

Moreover, such an arrangement of the tank more easily ensures safety, more particular regarding the possible fuel leakages and fire hazards.

Advantageously, a guiding and fastening device, including at least one projecting slide, is provided for mounting said rear cone at the rear portion of the fuselage.

Furthermore, complementary connection organs are provided at the rear portion of the fuselage and on said rear cone so as to automatically provide a fluidic link between said tank and said fuel cell system, when said rear cone is mounted at the rear portion of the fuselage.

Preferably, said rear cone comprise a projecting front longitudinal skirt able to be embedded into said rear portion of the fuselage, when said rear cone is fastened to the latter.

The rear portion of the fuselage could be truncated by a substantially planar rear end side and the rear cone could comprise a substantially planar front end side, said rear and front end sides carrying said complementary connection organs/devices and at least one portion of said guiding and fastening organs/devices being adjacent when the rear cone is fastened to the rear portion.

Advantageously, a fire-fighting wall is arranged on the rear end side of the fuselage and/or on the front end side of the rear cone.

It results from the foregoing that the present invention also relates to a rear cone as such shaped as a fuel tank and removably fastenable on the rear portion of the fuselage of an aircraft.

BRIEF DESCRIPTION OF DRAWINGS

The FIGS. of the appended drawings will better explain how this invention can be implemented. In these FIGS., like reference numerals relate to like components.

DETAILED DESCRIPTION

Figure 1:
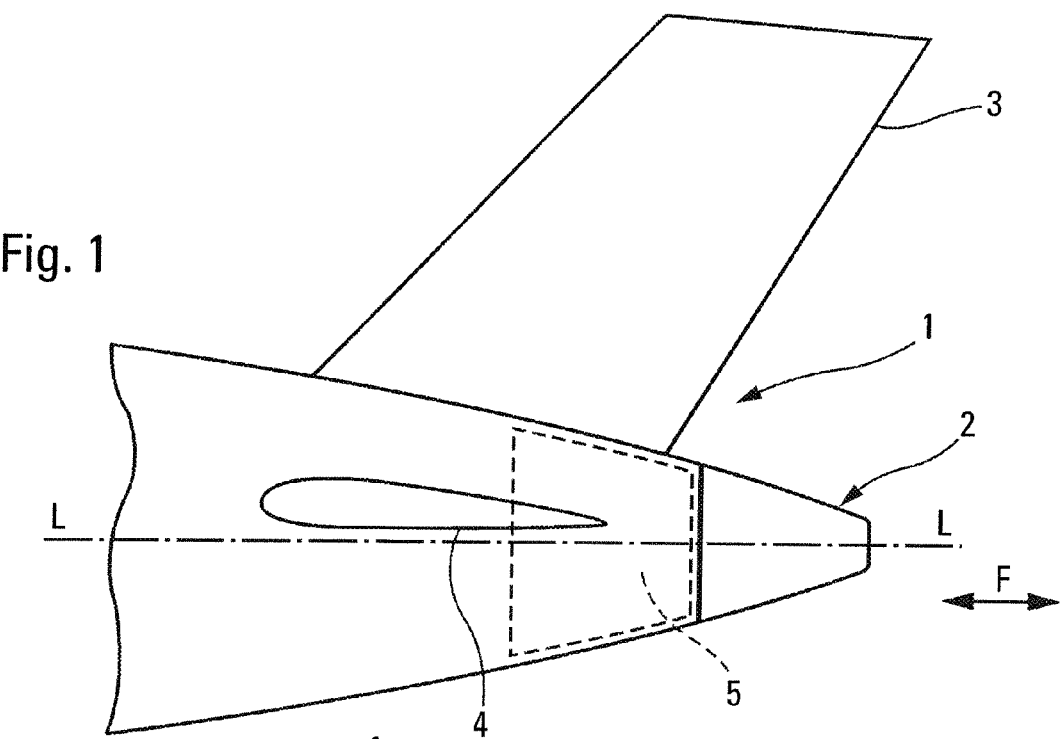
FIG. 1 schematically shows, in a side view, the rear portion of the fuselage of an aircraft on which there is fastened a removable rear cone according to this invention.

The aircraft tail shown on FIG. 1 comprises a rear portion of the fuselage 1 and a rear cone 2, said rear portion of the fuselage 1 comprising a vertical stabilizer 3, a horizontal stabilizer 4 and a fuel cell system 5 embedded on board within the fuselage.

The rear cone 2 is shaped as a fuel tank and removably fastened to the fuselage, as illustrated by the double arrow F. The rear portion 1 of the fuselage is therefore truncated by a volume corresponding to the tank rear cone 2. The removable and interchangeable function of the tank rear cone 2 allows it to be filled in the factory and makes it reusable on the same aircraft or on other aircrafts. Similarly, its maintenance can be performed in the factory.

The tank rear cone 2 is a standard rear cone, that is it could be replaced by another compatible rear cone, with an identical or different size.

The tank rear cone 2 could have an extended end not shown on the FIGS., increasing further the storage volume of the fuel.

Figure 2:
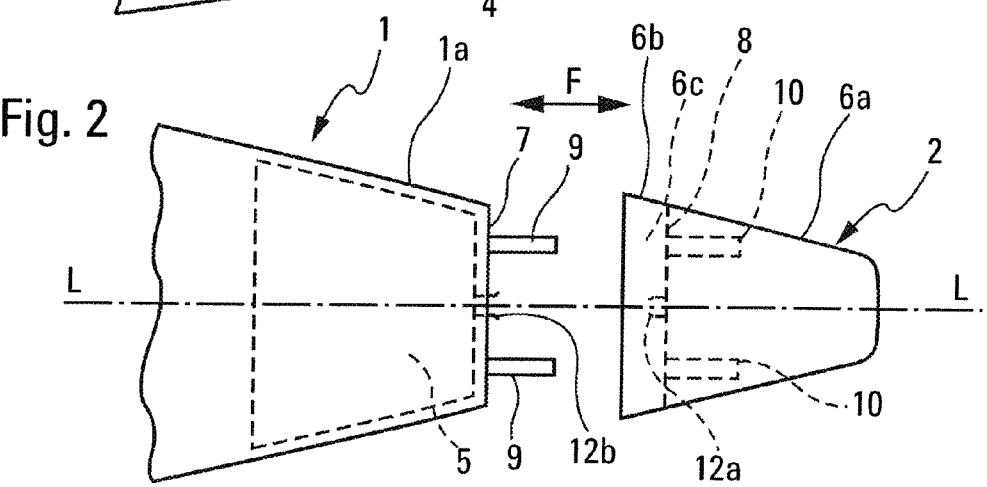
FIGS. 2 and 3 schematically show, in a partial top view, an embodiment of the present invention, said removable rear cone being respectively removed and fastened to the rear portion of the fuselage.
Figure 3:
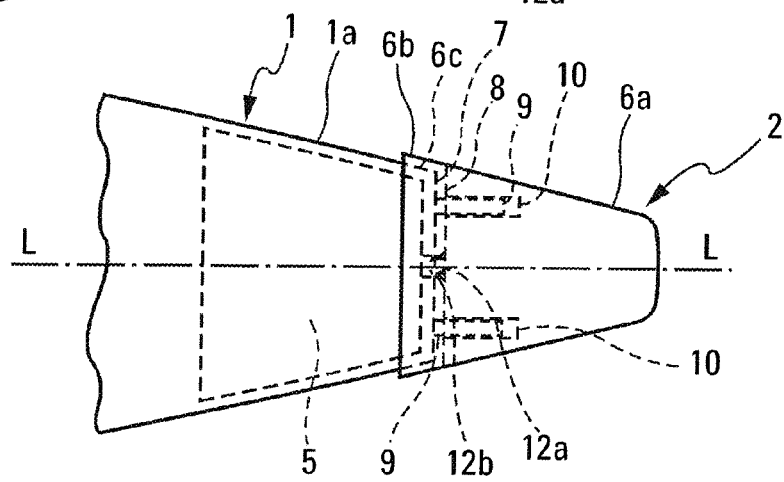

In the embodiments of FIGS. 2 and 3, the tank rear cone 2 is bound by a longitudinal shell 6a and a planar front end side 8. It comprises a front longitudinal skirt 6b extending the longitudinal shell 6a projecting from the front end side 8. A space 6c is thereby bound by the front longitudinal skirt 6b, ahead of said end side 8.

When the tank rear cone 2 is fastened on the rear portion 1 of the fuselage, as illustrated on FIG. 3, the front longitudinal skirt 6b is fitted around the longitudinal wall 1a of the rear portion 1 at the level of the space 6b and the front end side 8 of the tank rear cone 2 is adjacent to a planar rear end side 7 of the rear portion 1, this planar rear end side 7 being orthogonal to the longitudinal axis of the fuselage L-L.

The tank rear cone 2 is mounted on the rear portion 1 of the fuselage by means of a not shown support equipment.

This support equipment moves in translation (arrow F) the tank rear cone 2 according to the longitudinal axis L-L of the fuselage of the aircraft. It allows to bring the front end side 8, perpendicularly to the longitudinal axis L-L and in the vicinity of the rear end side 7 of the rear portion 1. It could have side sucking cups for protecting the rear portion of the fuselage 1 from potential shocks with the tank rear cone 2.

A guiding and fastening device arranged on the rear portion 1 of the fuselage cooperates with a guiding and fastening device arranged on the tank rear cone 2. The guiding and fastening devices include, in the example of FIGS. 2 and 3, two slides 9 arranged in projection of the rear end side 7 of the rear portion 1 of the fuselage and cooperating with two housings 10 arranged in the tank rear cone 2 opposite the front longitudinal skirt 6a with respect to the end side 8. The slides 9 can be fitted into the housings 10 providing their guidance through their shape complementary to the slender shape of the slides 9. Alternatively, the slides 9 could be arranged on the tank rear cone 2 and the housings 10 on the rear portion 1.

Reinforcing members adapted for protecting the fuselage from a possible sparking off in the vicinity of the tank rear cone 2 and not shown could be arranged on the rear end side 7 and the front end side 8.

The tank rear cone 2 is connected to the fuel cell system 5 by fluidic connection organs 12a and 12b. A male fluidic connection organ 12a arranged in projection of the front end side 8 automatically in the female fluidic connection organ 12b arranged in projection of the rear end side 7 upon the rear cone 2 being mounted on the rear portion 1. Non shown supplying means move the fuel from the tank rear cone 2 toward the fuel cell system 5

The tank rear cone 2 could comprise, on its longitudinal shell 6a, photovoltaic cells allowing energy to be generated for the operation of the control systems of the aircraft, in particular when the aircraft is on the ground.

The invention claimed is:

1. An aircraft comprising:
   a fuselage with a rear portion containing a fuel cell system, the rear portion of the fuselage including a rear end side proximate to the fuel cell system, at least one projecting slide extending from the rear end side, and a first fluidic connection organ communicating with the fuel cell system and located at the rear end side; and
   a rear cone removably mounted relative to the rear portion of the fuselage so as to form an extension thereof, the rear cone shaped as a fuel tank defining a volume to be filled with fuel for the fuel cell system contained in the rear portion of the fuselage, the rear cone including a front end side, at least one housing opening at the front end side and extending into the volume of the fuel tank, and a second fluidic connection organ communicating with the fuel tank and located at the front end side,
   wherein the first and second fluidic connection organs are complementary such that when the rear cone is mounted relative to the rear portion of the fuselage by guiding and fastening the at least one projecting slide into the at least one housing, the first and second fluidic connection organs are automatically aligned and connected as the front and rear end sides are engaged without further actions required during mounting and installation of the rear cone.

2. The aircraft according to claim 1, wherein the rear cone is interchangeable with compatible rear cones.

3. The aircraft according to claim 1, wherein the rear portion of the fuselage includes at least two of the projecting slides, and wherein the rear cone includes at least two of the housings sized to receive the at least two projecting slides.

4. The aircraft according to claim 1, wherein the rear cone further comprises a projecting front longitudinal skirt which is fittable on the rear portion of the fuselage when the rear cone is fastened thereto.

5. The aircraft according to claim 1, wherein the rear end side defines a substantially planar rear end side and the front end side defines a substantially planar front end side, the respective rear and front end sides being oriented generally perpendicular to a longitudinal extent of the at least one projecting slide and the at least one housing.

6. A rear cone for an aircraft having a fuselage with a rear portion containing a fuel cell system, the rear portion of the fuselage including a rear end side proximate to the fuel cell system, at least one projecting slide extending from the rear end side, and a fuselage fluidic connection organ communicating with the fuel cell system and located at the rear end side, the rear cone comprising:
   a fuel tank defining a volume to be filled with fuel for the fuel cell system, the fuel tank adapted for being removably mounted on the rear portion of the fuselage;
   a front end side on the fuel tank;
   at least one housing opening at the front end side and extending into the volume of the fuel tank, the at least one housing sized to guide and fasten the at least one projecting slide extending from the rear end side of the fuselage when the rear cone is mounted on the fuselage; and
   a tank fluidic connection organ communicating with the fuel tank and located at the front end side such that the tank fluidic connection organ communicates with the fuselage fluidic connection organ when the rear cone is mounted on the fuselage.

7. The rear cone according to claim 6, wherein the rear cone is interchangeable with compatible rear cones.

8. The rear cone according to claim 6 further comprising, a projecting front longitudinal skirt which is fittable on the rear portion of the fuselage when the rear cone is fastened thereto.

9. The rear cone according to claim 6, wherein the rear cone includes at least two of the housings.

10. The rear cone according to claim 6, wherein the front end side defines a substantially planar front end side oriented generally perpendicular to a longitudinal extent of the at least one housing.

* * * * *